United States Patent
Bentley

[11] 3,853,403
[45] Dec. 10, 1974

[54] COMPOUND OPTICAL-SENSOR SYSTEM FOR VISUALLY OBSERVING AND PHOTOELECTRICALLY SENSING CODED INDICIA

[76] Inventor: George P. Bentley, 168 Cherry Ln., Amherst, Mass. 01002

[22] Filed: Nov. 12, 1973

[21] Appl. No.: 414,819

[52] U.S. Cl. ............ 356/71, 250/568, 340/146.3 F, 350/54, 350/202, 356/209
[51] Int. Cl. ........................ G06k 9/08, G01n 21/48
[58] Field of Search ...... 356/209, 71; 250/567, 568; 350/54, 202; 340/146.3 F, 146.3 Z; 235/61.11 E

[56] References Cited
UNITED STATES PATENTS
3,176,140  3/1965  Schroth .............................. 250/568
3,238,501  3/1966  Mak et al. ............................. 356/71

Primary Examiner—Vincent P. McGraw
Attorney, Agent, or Firm—Morgan, Finnegan, Durham & Pine

[57] ABSTRACT

Apparatus for visually observing and photoelectrically sensing coded indicia on a document. A lens system is provided for imaging the coded indicia upon apertures in a mask wherein preselected portions of the region of interest are magnified and imaged upon apertures in the mask, which apertures are smaller in size than the images aligned therewith. The portions of interest passing through their associated mask apertures are re-imaged at a plane at which is provided a photosensing device or devices. A second movable mask is provided for sequentially enabling the image at each aperture in the first mask to be directed to the photosensing plane.

Additional optical elements are provided for providing a visually observable projection of the apertures in the first mask superimposed with the indicia in the region of interest, which superimposed images are so positioned relative to the actual region of interest to enable an observer to substantially simultaneously view both the region of interest and the aforesaid superimposed images to permit simple, rapid, and positive alignment of the region of interest containing the coded indicia relative to the aforesaid first mask.

22 Claims, 6 Drawing Figures

TYPICAL BAR CODE

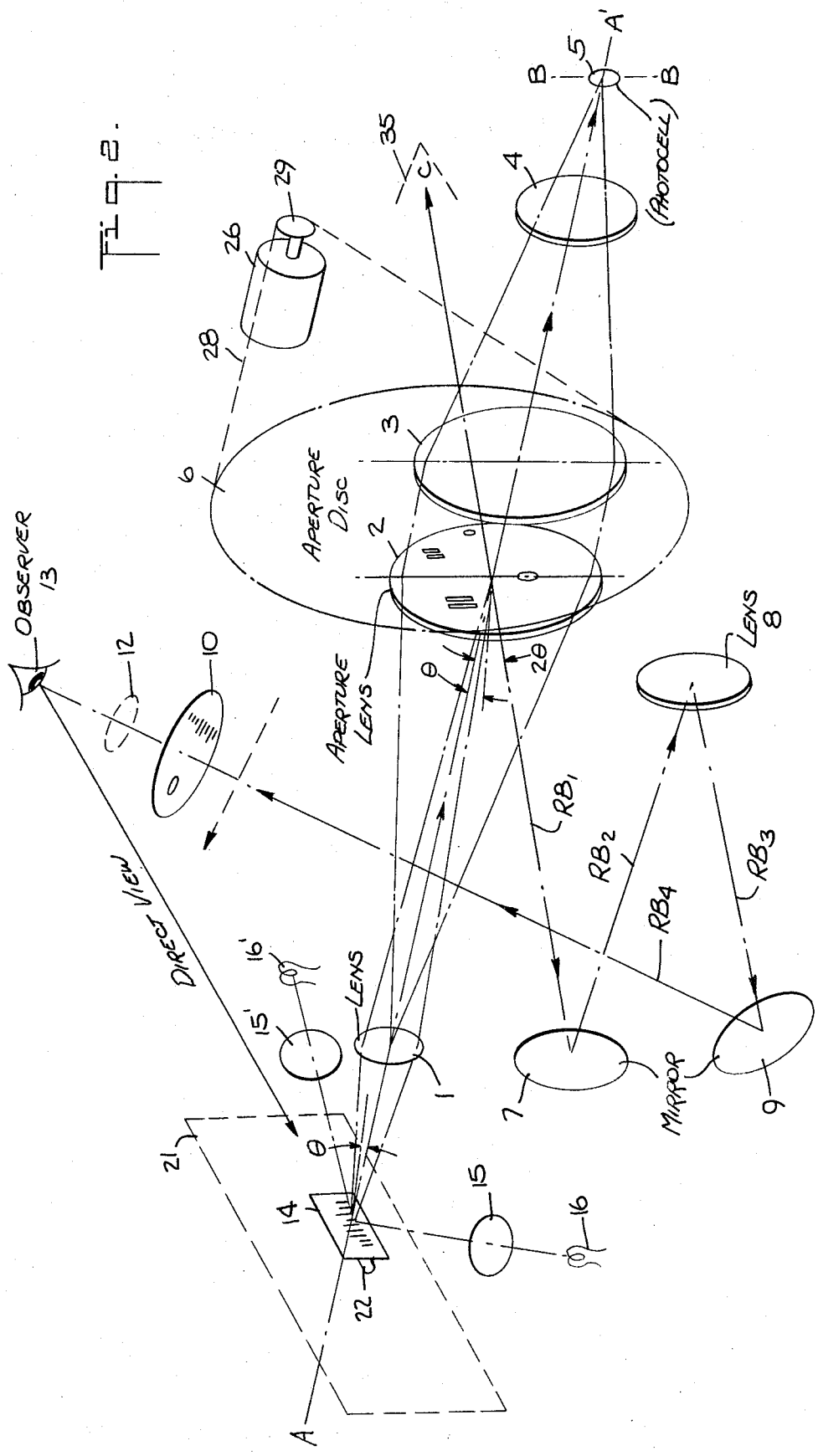

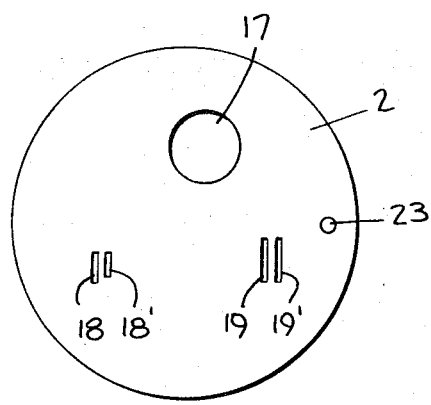
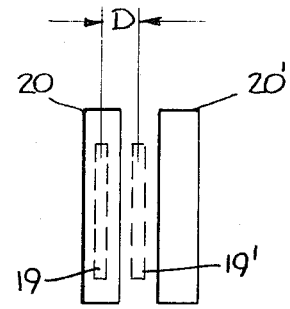
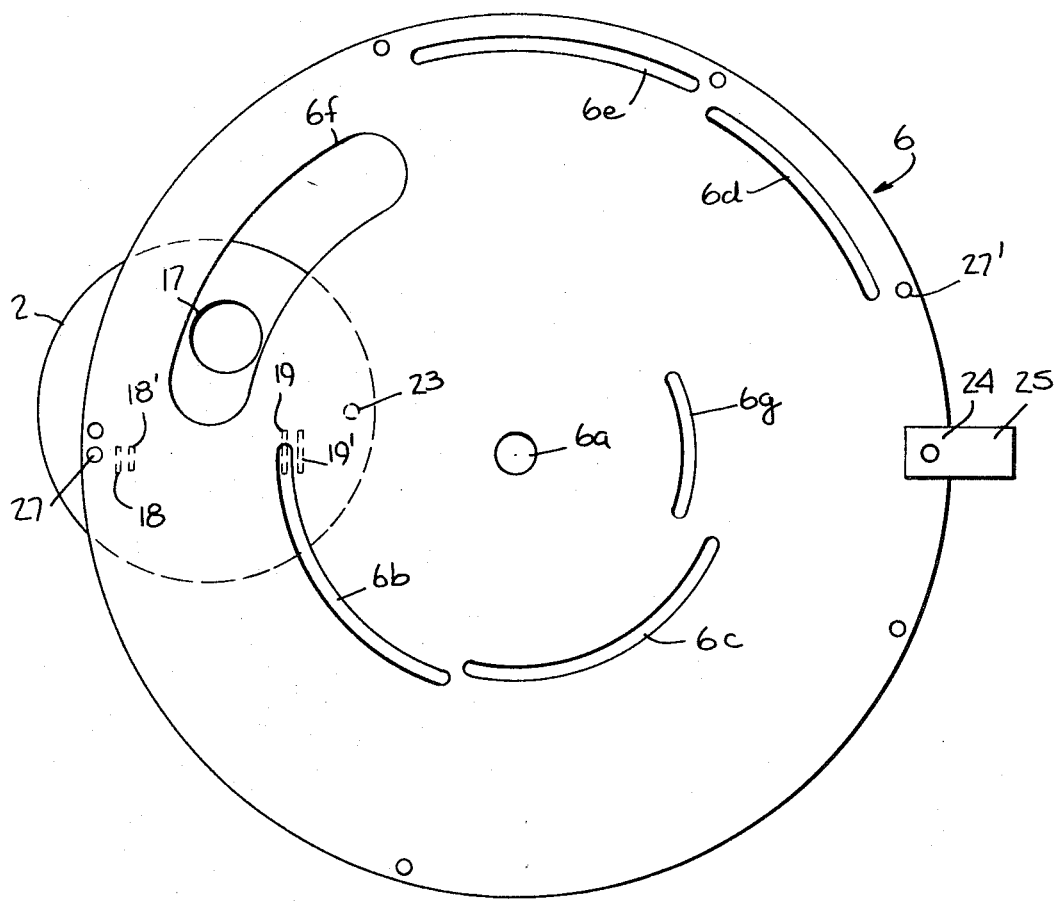
Fig. 2a
Fig. 2b
Fig. 2c

COMPOUND OPTICAL-SENSOR SYSTEM FOR VISUALLY OBSERVING AND PHOTOELECTRICALLY SENSING CODED INDICIA

BACKGROUND AND BRIEF DESCRIPTION OF THE INVENTION

The present invention relates to optical imaging systems and more particularly to a novel compound optical system for providing time sequential sensing the coded indicia and for providing an image of the region containing the coded indicia so positioned relative to the region of interest containing the coded indicia as to permit substantially simultaneous observation of the superimposed image and the actual region of interest thereby facilitating simple and rapid adjustment of the code bearing region relative to the optical system.

In the production and observation of characters formed on film, paper or other substrates, it is often desirable to determine the reflectivity (or transmittance) of the characters or other indicia, of the substrate itself or of the contrast ratio of the characters and substrate defined as:

$$(R_s - R_i)/R_s$$

where:

$R_s =$ reflectivity of the substrate; and
$R_i =$ reflectivity of the character.

In addition thereto, it is often desirable to determine such values through the use of a photosensor-filter system typically having a specified spectral response characteristic. This can be, for example, the visual response of the eye or the photometric response of an optical character recognition (OCR) scanning device.

In the process of controlling the production of ink code bars on paper, for example, the United States Postal Service is desirous of insuring a sufficient contrast ratio to the spectral response of a high speed OCR scanner so that reliable operation may be obtained. One particular type of information desired to be read consists of code bar patterns which may be used, for example, to identify a document or its destination.

A typical code bar pattern, which will be described in greater detail hereinbelow, consists of individual code bars arranged in a closely spaced manner. A system for recognizing such patterns must be capable of permitting accurate measurement of each code bar, which is a dark area of small size having a very low reflectance, and is surrounded by a relatively large area having a very high reflectance. It thus becomes necessary to provide a system which is capable of preventing the bright area surrounding a code bar from influencing the observance and sensing of the code bar to yield an erroneous observation.

The present invention is characterized by providing a compound optical-sensor system which is capable of effectively eliminating the influence of the bright area surrounding a code bar being observed to thereby provide accurate identification of the code bar.

The present invention is comprised of a first mask having a "window" and including apparatus for positioning a substrate behind the mask so as to position the region of the substrate containing the coded indicia of interest immediately behind the "window" of the mask.

Illumination means including appropriate elements serves to illuminate the sample area with uniform light flux.

A first lens images the indicia of the sample upon the rear planar surface of the plano-convex lens having a mask of a highly reflective material deposited thereon, which mask is provided with a predetermined array or apertures for viewing purposes. The apertures in the second mask are selected to be smaller in size than the size of the indicia of the sample imaged upon said second mask. The first lens magnifies the indicia of the sample so that the indicia imaged upon each aperture in the second mask are dimensionally larger than the apertures of the second mask to prevent the regions of high reflectance surrounding each indicia to be passed through the apertures of the second mask.

A third lens images the systems aperture formed by the first lens by light passing through the apertures of the second mask at a plane containing photosensing means. Third movable mask means is operated to move relative to the second stationary mask means to present each aperture in the second mask means to the photosensing device in a time sequential manner.

Although the substrate and the first and second lenses are arranged in spaced parallel fashion and perpendicular to an imaginary horizontal line, for example, the optical axis, which passes through the centers of the first and second lenses, is arranged at a slight angle relative to said imaginary line to provide for "off-axis" projection. The second mask means is provided with a reflective surface for directing the imaged sample as well as the apertures in the second mask toward a system of optical elements which serve to present a visually observable superimposed image of the sample and the second mask means apertures which is so arranged as to permit simultaneous viewing of the actual sample and the aforementioned superimposed images. This arrangement greatly facilitates manipulation of the substrate by an observer to assure accurate registration as between the apertures in the second mask means and the indicia of the sample. The "off-axis" projection arrangement causes any stray light entering into the system by way of the external ambient illumination at the viewing screen to the point of the superimposed image to pass through the apertures of the second mask means at an angle which is sufficient to prevent the stray light therefrom from reaching the photosensing devices. The off-axis projection arrangement also prevents light from the substrate from being reflected back to the substrate by the reflective mask.

The second mask means is provided with apertures for passing one image of a region of the sample which is free of the coded indicia as well as a marginal region of the first mask adjacent one edge of the "window" to respectively provide reference light flux readings to enable the electronics interfaced with the photosensing device to establish appropriate threshold levels for the reflectance measurement operation.

Thus, by magnifying the indicia of the sample and imaging said indicia upon apertures in the second mask means of moderately reduced size relative to the magnified images, it is possible to prevent regions of high reflectance surrounding the indicia from influencing the recognition of the indicia so as to prevent the photosensitive devices from erroneously interpreting the indicia.

It is therefore one object of the present invention to provide a novel optical system for photoelectrically sensing indicia on a substrate and having means for imaging only the indicia being read upon the photosensing element so as to prevent regions of high reflectance surrounding the indicia being sensed from influencing the proper recognition of the imaged indicia.

Another object of the present invention is to provide a novel compound optical-sensor system capable of simultaneously optically sensing indicia on a substrate and observing the substrate and a projected image thereof which is superimposed upon images of apertures employed in the photosensing apparatus to facilitate registration of the substrate with the optical system.

Still another object of the present invention is to provide an optical system for time sequential recognition of indicia employing an optical system which eliminates influences of regions surrounding the indicia undergoing recognition to prevent erroneous recognition of the indicia.

Still another object of the present invention is to provide a novel compound optical-sensor system which provides a superimposed image of the indicia undergoing recognition and the apertures employed in the photosensing operation to facilitate registration of the indicia with the optical system wherein an "off axis" projection technique is employed to prevent ambient light which enters into the system from the region of the superimposed image viewing location from harmfully affecting the indicia recognition operation.

A BRIEF DESCRIPTION OF THE FIGURES

The above as well as other objects of the present invention will become apparent from a consideration of the following description taken in connection with the accompanying drawings in which:

FIG. 2a shows an enlarged view of the aperture mask provided on the plano-convex lens which forms part of the imaging and registration apparatus of the system of FIG. 2.

FIG. 2b shows an enlarged view of two of the apertures of the mask portion of FIG. 2a with images superimposed thereon.

FIG. 2c shows the aperture lens and movable time sequencing mask of FIG. 2 in greater detail.

FIG. 3 is a diagrammatical perspective view showing another alternative embodiment for the illuminating arrangement of the optical system shown in FIG. 2.

DETAILED DESCRIPTION OF THE INVENTION

Figure 1:
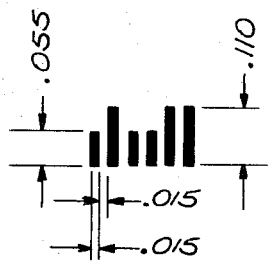
FIG. 1 shows a typical ink code bar pattern presently used by the United States Postal System.

FIG. 1 shows a typical ink code bar pattern presently being utilized by the United States Postal System, with nominal dimensions given in inches. The code pattern of FIG. 1 is comprised of short code bars, whose nominal dimensions are 0.05 × 0.015 inches, and long code bars whose nominal dimensions are 0.110 × 0.015 inches. It is very important to permit measurement of the rather small dark areas of the code bars which are surrounded by relatively large bright regions. The short code bars are typically a black having a reflectivity of 1 percent surrounded by a white substrate reflecting 80 percent or more of the light impinging upon the substrate.

In order to accurately recognize exactly which code bar is being measured the optical-sensor system of the present invention permits an operator to select one of several field areas at a sample plane, which field areas have great latitude as to size and shape, and to insure that only the desired area is measured while the surrounding areas are excluded from optical effect, all of which is accomplished without precise positioning of movable optical elements. The system also provides for accurate measurement of the values of reflectance of the ink bars, the reflectance of the space between bars and the reflectance of the substrate above the bar pattern area, all of which measurements may then be used to process the sensor output and compute the contrast ratio for setting appropriate threshold values.

It should further be noted that the problems associated with reading code bar patterns also occur in line measurement, in microfilms, dot measurement and half-tones and any type of optical character production and that the present invention is adaptable for use in any and all such applications.

Figure 2:
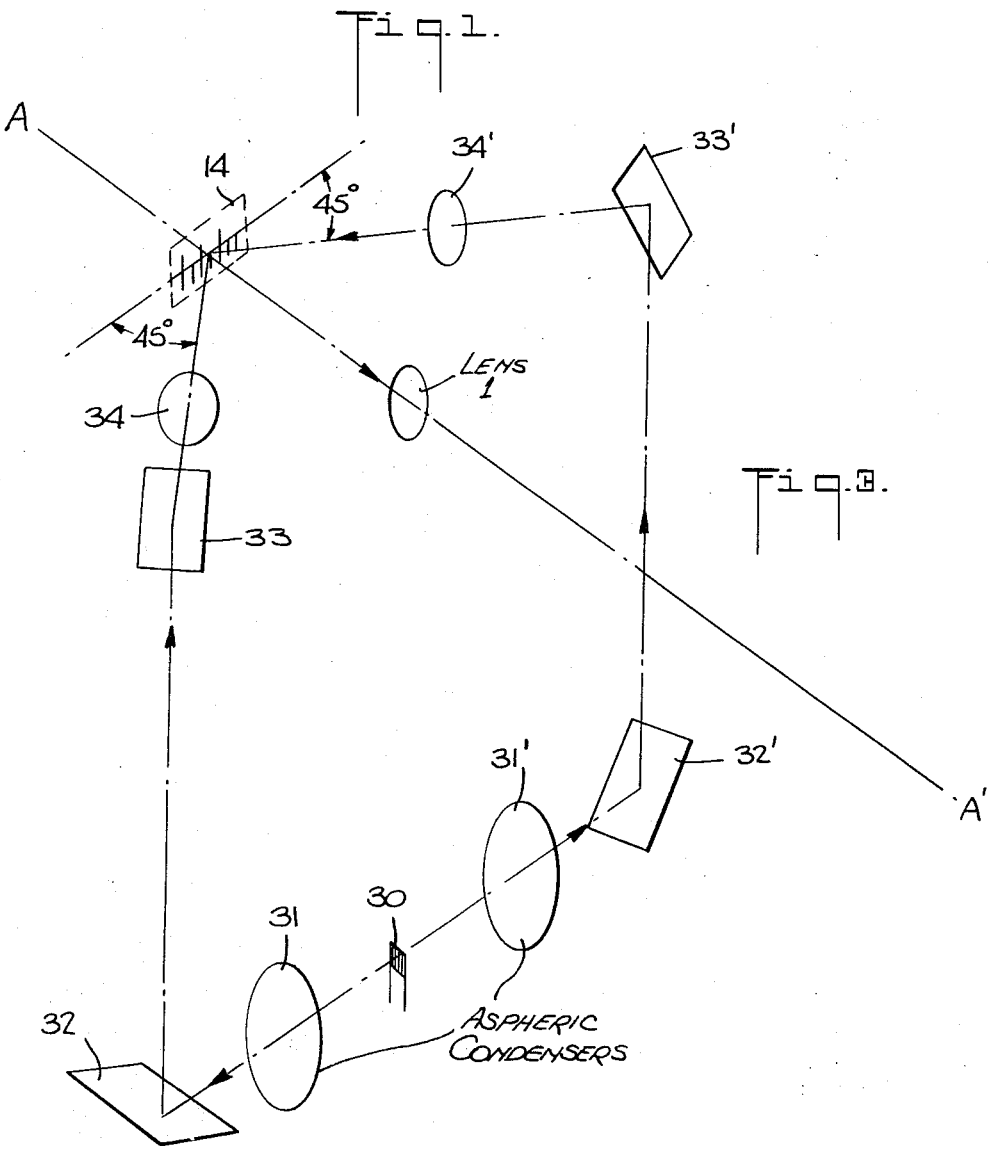
FIG. 2 is a simplified diagrammatical perspective view of a compound optical-sensor system in accordance with the principles of the present invention.

The optical system which has been developed to fulfill all of the above requirements is shown in FIG. 2 and is comprised of a source of illumination shown in simplified fashion as lamp filaments 16, 16'. Cooperating lenses 15, 15' act to focus the light from their associated lamp sources to illuminate a sample area 14 with uniform light flux. Area 14 is preferably the "window" of a mask having an object 21 positioned immediately therebehind, which object may, for example, be an envelope, package, paper document or other substrate having a bar code pattern positioned so that the bar code pattern lies within the confines of the illuminated "window" 14.

An objective lens 1, which is preferably an achromat or triplet to provide a sharp image, acts to image the indicia in window 14 in an enlarged format (typically 4X) upon the rear surface of a plano-convex lens 2. Lens 2 is coated on its plane surface, which is furthest removed from window 14, with a reflective or mirror coating so that the reflective surface faces window 14. Apertures 17, 18, 18', 19, 19' and 23 (see FIG. 2a) are formed in the reflective coating, which apertures define the size and shape of the areas at the sample position in window 14 which are to be selected for measurement and recognition.

For example, FIG. 2b shows the magnified images of two black bars 20 and 20' from the code pattern positioned behind window 14. At 4X magnification at the rear plane of lens 2, the image of the bars are 0.060 × 0.440 inches, while apertures 19–19' are 0.020 × 0.320 inches having their center lines spaced a distance $D = 0.060$ inches. When located relative to the code bar images as shown in FIG. 2b, aperture 19 represents an area 0.005 × 0.080 inches centered on a black bar image 20, and aperture 19' represents an equal area of the substrate centered between the black bar images 20 and 20'.

In similar fashion, apertures 18 and 18' can be positioned relative to the short code bars (see FIG. 1) and aperture 17 is positioned to select an area of the substrate within window 14 above the code bar area.

As shown in FIG. 2, only light from the regions of the code bar pattern which impinges upon apertures 18, 18', 19, 19', 17 and 23 passes through lens 2. It should further be noted that a small area 22 adjacent one edge of window 14 is preferably coated with a near-white durable coating, which area is formed on a marginal portion of the mask surrounding the window 14 to provide a reference flux. Spot 22 is imaged by objective lens 1 in an enlarged format at aperture 23 in the coating of a plano-convex lens 2. This flux also passes through aperture 23 on the rear surface of lens 2.

Before considering the light passing through the apertures in lens 2, consideration will be given to the light reflected from the mirror coating on the rear plane surface on lens 2. The sample plane having the code bar pattern positioned behind window 14, the plane of lens 1 and the plane of lens 2 are all arranged in spaced parallel fashion. However, optical axis A–A' is at a small angle $\theta$ relative to an imaginary line which is perpendicular to the several planes. Typically, this angle is of the order of 7°. Such an arrangement is optically referred to as "off-axis" projection wherein optical axis A–A' passes through the centers of lenses 1 and 2.

Light passes from lens 1 through lens 2 to the reflective coating and then back through lens 2, emerging at an angle $2\theta$ relative to the entering beam. Since the light is acted on twice by lens 2, the lens 2 acts on the reflected beam as if it had twice the power (one-half the focal length) of a simple lens with light traversing completely through it.

By selection of a suitable focal length for lens 2, objective lens 1 (which defines the system aperture) is imaged at achromat lens 8. Optical element 7 consists of a planar mirror to fold the reflected beam RB1 in a direction RB2 toward lens 8 for compactness of the optical system.

The re-imaging of lens 1 at lens 8 insures that no light is lost in the projection process to be described, except for surface losses at the optical surfaces.

Achromat lens 8 is also preferably a plano-convex design, which is mirror-coated on its rear planar surface. Lens 8 reflects the beam in the direction RB3 so as to image the rear coating and apertures on lens 2 at rear projection screen 10, via beam-folding mirror 9 which deflects the beam RB3 in the direction RB4. However, if the bar code pattern behind window 14 is also imaged at the rear of lens 2, the sample in window 14 will also be imaged by lenses 2 and 8 at a viewing plane 10. The operator will thus see a simultaneously superimposed image of the code pattern behind window 14, as well as apertures 17, 18, 18', 19, 19' and 23. To insure that the code bar pattern behind window 14 is imaged precisely at the rear plane of lens 2, lens 1 is preferably adjusted to obtain zero parallax between the image of the bar code pattern and the apertures at the rear plane surface of lens 2.

The image at viewing plane 10 is erect and correctly oriented so that it appears to an operator exactly the same as a direct observation of the sample behind window 14, except for the magnification. It is thus easy for the operator to manually adjust the sample 21 behind window 14 to position the desired region of measurement so that the code bar patterns to be measured are in proper registration with the associated apertures provided along the rear surface of lens 2.

The screen 10 for viewing the magnified superimposed images of the apertures and the code pattern sample may be of the rear projection type. As an alternative to screen 10, the viewing eye-piece 12 may be employed to view an aerial image at 11 and thereby eliminate the need for screen 10.

A consideration will now be given of the light energy passing through the apertures provided along the rear reflective coated surface of lens 2.

Lens 3, acting together with lens 2, images lens 1 in reduced size at sensing plane B–B'. Since lens 1 is the aperture stop of the system, the image at sensing plane B–B' will be a uniformly illuminated circle. Since all rays of light that would pass through lenses 2 and 3, if lens 2 were not coated in the manner previously described, would act to form such an image at plane B–B', similarly the restricted rays passing through apertures 17, 18, 18', 19, 19' and 23 form an image in the viewing plane B–B'. In fact, light from any one aperture or from all apertures in lens 2 will form identical images at B–B' (subject only to lens aberration).

Thus, if all apertures provided along the surface of lens 2 (see FIG. 2a) are covered by a mask 6 positioned immediately behind lens 2, then the energy reaching a photo-sensor 5 positioned at the image of lens 1 in plane B–B' can be calibrated to read the reflectance of the area behind window 14 which corresponds to the imaged aperture. If each aperture along the rear surface of lens 2 is uncovered in time sequential fashion, then the reflectances of the regions behind window 14 as well as reference region 22, all of which are associated with those apertures, can be evaluated in time sequence.

In order to accomplish this time-sequential operation, an aperture disc 6 is located between lenses 2 and 3. FIG. 2c shows the details of the aperture pattern on lens 2 and the aperture pattern in disc 6. Disc 6 is mounted to rotate about its central axis 6a, for example, by means of a closed loop belt 28, shown in dotted fashion in FIG. 2, which is entrained about the periphery of disc 6 and about the periphery of a pulley 29 mounted upon the output shaft of a motor 26. Disc 6 is shown in FIG. 2c as having a plurality of arcuate shaped apertures each positioned at differing radial distances from rotation axis 6a, each arcuate aperture being associated with one of the apertures provided along the rear surface of lens 2.

For example, arcuate shaped apertures 6b and 6c are associated with apertures 19 and 19'; arcuate shaped apertures 6d and 6e are associated with apertures 18 and 18'; arcuate shaped aperture 6f is associated with aperture 17; and arcuate shaped aperture 6g is associated with aperture 23. The apertures provided in disc 6 for reading code bars can all be seen to be staggered so as to expose only one of the apertures for imaging code bars at any given time. Assuming clockwise rotation of disc 6 relative to FIG. 2c, the sequential order of imaging will be aperture 19, aperture 19', aperture 18 and aperture 18'. Aperture 23 in aperture lens 2 is also selectively uncovered by arcuate aperture 6g in disc 6.

Additional apertures 27 and 27' are provided at spaced intervals about the periphery of disc 6 and act to cooperate with a light-emitting diode 24 and photo-senser assembly 25, positioned on opposite sides of disc 6, to provide logic signals to the electronic system for timing and proper signal treatment.

The system of FIG. 2 further shows a filter 4 which may be utilized to modify the system spectral response as desired.

Associated electronics (not shown for purposes of simplicity) are coupled to the photocell detector for utilizing reference flux signals from region 23 which passes through aperture 22 in lens 2 for stabilization purposes. Signals from apertures 18, 18', 19, 19' and 17 can be used to directly indicate the reflectance corresponding to each aperture. Alternatively, contrast ratio may be computed from selected combinations of apertures by associated analog or digital ration computational circuits of conventional types.

FIG. 3 shows a high efficiency illumination system. In the arrangement of FIG. 3, there is provided a 50 watt tungsten halogen lamp 30 which is located below and forward (toward the operator) of lens 1. Light from opposite sides of lamp 30 is collected by aspheric condenser lenses 31, 31'. Mirrors 32, 32' fold the beams emerging from lenses 31, 31' respectively upwardly toward mirrors 33, 33', which mirrors fold the beams back into a horizontal plane and direct the folded beams toward window 14 at angles of 45°. Projection lenses 34, 34' act to image condenser lenses 31, 31' respectively at window 14 in reduced size, thereby providing a high intensity uniform illumination in the window region 14.

If desired, heat absorbing filters may be placed at appropriate positions in the illumination system, which heat absorbing filters may be omitted if response in the infra-red is required.

A further feature of the present invention resides in the ability of the optical system to reject stray light entering by way of the external ambient illumination in the region of screen 10. Any external ambient light flux striking screen 10 will cause light to be radiated from the screen into the optical system. Stray light stops (not shown for purposes of simplicity) may be utilized in the region between screen 10 and mirror 9 to restrict such energy to a beam striking mirror 9 and being imaged back through lens 8 and mirror 7 to form the image at screen 10 at the rear surface of lens 2. The flux forming this image may pass through the aperture in the reflected coating along the rear surface of lens 2, forming an image of lens 8 in reduced size at a point along the line RB1 extending from mirror 7 to point C. A light trap 35 may be utilized at this point to absorb the stray flux.

Thus, due to the off-axis projection angle θ, the back-radiated flux from viewing screen 10 passes along line 7–C and not along axis A–A' so as to be prevented from striking or otherwise impinging upon photocell 5, effectively making photocell 5 unresponsive to ambient flux originating at viewing screen 10. It should also be noted the light from the sample in window 14 is reflected by the rear surface of lens 8 along path RB1 and away from window 14 or lens 1.

Further, by using an off-axis projection angle θ of small value (such as 7°), the pattern at window 14 will be imaged sharply at the apertures at lens 2, accurately defining the area of measurement. If greater angle (such as 45°) were used, optical depth-at-focus problems would adversely affect such accuracy of definition.

It can therefore be seen from the preceding description that the present invention provides a novel compound optical-sensor system in which indicia to be examined for pattern or character recognition purposes are magnified and imaged upon associated apertures which, while preferably similar in shape to the associated images, are of reduced size to prevent light from regions of high reflectance immediately surrounding the image indicia from reaching the photodetector devices to prevent degradation of the recognition capability of the system. The visually observable viewing screen provides a superimposed image of the indicia bearing region and the apertures upon which the indicia bearing region is imaged, which screen is so located in space as to permit substantially simultaneous viewing of the superimposed images and the actual sample to permit rapid adjustment of the indicia pattern within window 14 to assure perfect registration between the optical system and the indicia pattern to be recognized.

Although there has been described preferred embodiments of this novel invention, many variations and modifications will now be made apparent to those skilled in the art. Therefore, this invention is to be limited, not by specific disclosure herein, but only by the appending claims. For example, the rotating disc 6 used to view the indicia in time sequence may be substituted by a linearly movable mask member which may, for example, be in the form of a belt drive. Also, the apertures provided along the rear planar surfaces of lens 2 may be of any shape or configuration other than the rectangular shape shown herein and, for example, may have a shape similar to that of the indicia under observation. Also, a greater number of apertures may be provided along the rear planar surface of lens 2 to increase the pattern measurement capacity.

What is claimed is:

1. An optical device for measuring optical reflectance characteristics of characters and other like indicia arranged upon a substrate, the reflectivity of said substrate and the reflectivity of the indicia being substantially different, said device comprising:

a first mask having a window behind which the indicia bearing region of the substrate is adjustably positioned;

means for illuminating the region of the substrate behind said window with substantially uniform flux;

a first lens arranged a spaced distance from said window and having a front surface facing said window and a rear surface remote from said window;

a second lens positioned between said window and said first lens for imaging at least a portion of the illuminated indicia in said window on the rear surface of said first lens;

relfective means along the rear surface of said first lens for reflecting rays impinging on the surface of said reflecting means, said reflective means having at least one aperture for passing rays impinging upon said aperture through said aperture;

sensing means positioned in a sensing plane located a spaced distance from the rear surface of said first lens for sensing radiation passing through said aperture;

a third lens positioned between said first lens and said sensing means for imaging the aperture stop of said second lens in said sensing plane.

2. The device of claim 1 wherein said illuminating means comprises:

first and second lamps;

third and fourth lenses each being adapted to direct radiation from its associated lamp upon said substrate behind said window to collectively illuminate the region of said substrate behind said window with substantially uniform flux.

3. The device of claim 1 wherein said illumination means comprises a lamp;

first and second mirrors positioned on opposite side of said lamp;

third and fourth condenser lenses positioned to collect light from said lamp and direct the collected light upon said first and second mirrors respectively;

said first and second mirrors each being adapted to reflect light from their associated condenser lenses in a first direction;

third and fourth mirrors being adapted to reflect light from said first and second mirrors respectively, toward said window, the reflective surfaces of said third and fourth mirrors each being at an angle of the order of 45° relative to the plane of said window.

4. The device of claim 1 further comprising movable mask means positioned between said first lens and said sensing plane, said movable mask having at least one slot;

means for moving said movable mask to selectively move said slot and thereby enabling rays passing through said reflective means aperture to pass through said slot.

5. The device of claim 4 wherein said movable mask comprises an annular shaped disc mounted to rotate about its central axis;

the slot in said movable mask being arcuate in shape.

6. The device of claim 1 wherein said first lens is a plano-convex lens;

the planar surface of said plano-convex lens constituting said rear surface.

7. The device of claim 6 wherein said reflective means comprises a reflective coating deposited upon the rear surface of said plano-convex lens.

8. The device of claim 1 wherein said second lens is adapted to magnify the images of the indicia imaged upon the rear surface of said first lens.

9. The device of claim 8 wherein the aperture in said reflective means is smaller than the magnified image of the indicia imaged upon said aperture.

10. The device of claim 9 wherein the aperture has a configuration similar to the configuration of the indicia imaged upon said aperture.

11. The device of claim 1 wherein the indicia being presented for recognition comprises a plurality of code bars arranged in a spaced pattern.

12. The device of claim 11 wherein said reflective means is provided with a second aperture spaced from said first aperture wherein the distance (D1) between the centerlines of said apertures is less than the distance (D2) between the centerlines of adjacent code bars and preferably wherein $D1 = 1/2 \, DZ$.

13. The device of claim 12 wherein said reflective means is provided with a third aperture;

said mask having a reference region of a predetermined reflectivity positioned adjacent said window so as to be imaged upon said third aperture by said second lens.

14. The device of claim 12 wherein said reflective means is provided with a third aperture positioned so as to receive flux reflected from a region of the substrate behind said window and spaced from said indicia, which flux is imaged upon said third aperture.

15. The device of claim 14 further comprising movable mask means positioned between said first lens and said sensing plane, said movable mask having a plurality of slots each being associated with one of the apertures in said reflective means;

means for moving said movable mask to selectively move said slots thereby enabling rays passing through said reflective means to pass through said slots in sequential fashion.

16. The device of claim 1 wherein the planes of said window and said first and second lenses are parallel;

the centers of said first and second lenses being coincident with an optical axis which forms an acute angle with an imaginary line normal to the planes of said window and said first and second lenses to thereby provide an off-axis projection arrangement, whereby rays impinging on said reflective means are directed away from said window.

17. The device of claim 16 further comprising:

a viewing screen;

optical means for imaging the aperture in said reflective means and indicia imaged on the rear surface of said first lens upon said viewing screen, said viewing screen being oriented to enable the observer to view the substrate behind said window and the viewing screen substantially simultaneously.

18. The device of claim 17 wherein said substrate is adjustable relative to said window to enable an observer to move at least one of the indicia on said substrate into registration with the aperture in said reflective means, said registration condition being observable by means of the superimposed image displayed on said viewing screen.

19. The device of claim 17 wherein said optical means comprises an achromat lens for imaging the apertures and imaged indicia at the rear surface of said first lens upon said viewing screen;

said optical means being adapted to cause any external ambient light entering said achromat lens through said screen to pass through the aperture in said reflective means and be directed along a path which is transverse to said optical axis.

20. The device of claim 19 further comprising a light trap positioned along said path and between said first lens and said viewing plane to trap any stray light directed along said path and directed generally toward said sensing means.

21. The device of claim 16 further comprising a viewing eye-piece;

means cooperating with said eye-piece for developing an aerial image of the aperture in said reflective means and the indicia imaged on the rear surface of said first lens, said superimposed aerial image being observable through the use of said eye-piece;

said eye piece being positioned to facilitate viewing of said window.

22. The device of claim 21 wherein said substrate is adjustable relative to said window to enable an observer to move at least one of the indicia on said substrate into registration with the aperture in said reflective means, said registration condition being observable by means of the superimposed image viewable through said eye-piece.

* * * * *